J. M. Battum,
Watchmakers' Tool.
No. 375. Reissued July 8, 1856.
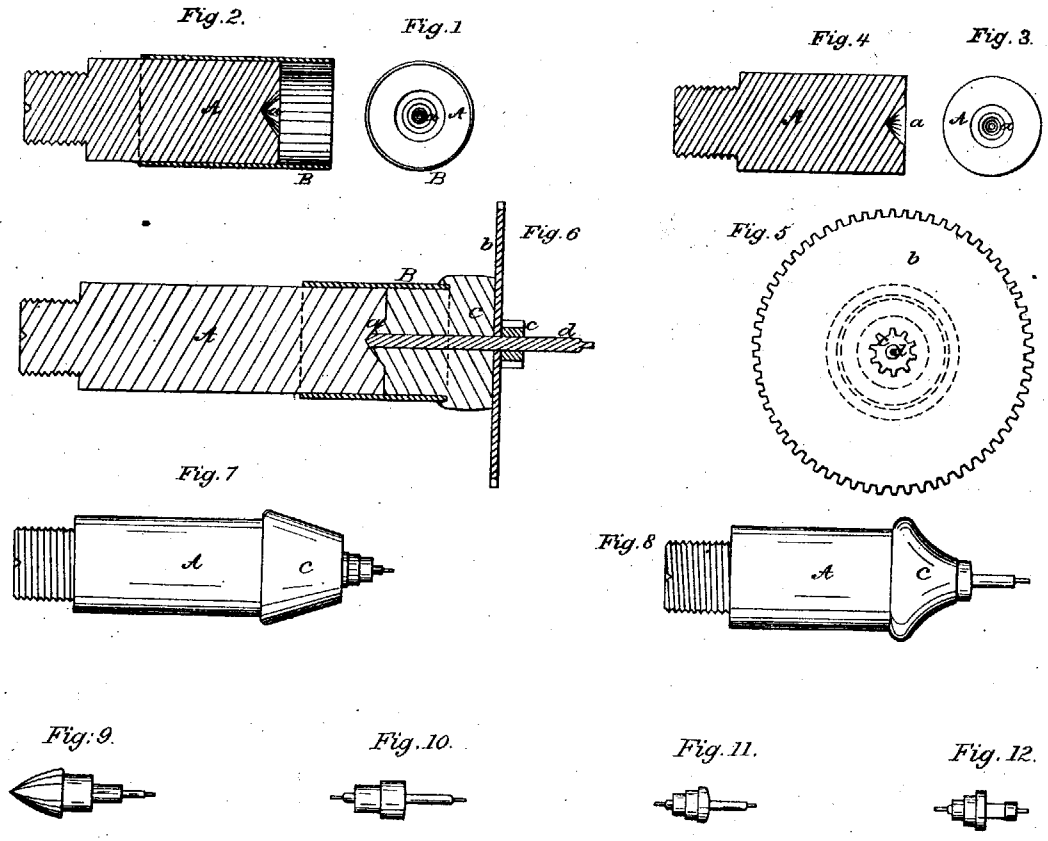
N. PETERS, PHOTO-LITHOGRAPHER, WASHINGTON, D. C.

UNITED STATES PATENT OFFICE.

JAMES M. BOTTUM, OF NEW YORK, N. Y.

IMPROVEMENT IN SECURING PINIONS, &c., OF WATCHES IN LATHES.

Specification forming part of Letters Patent No. 8,216, dated July 15, 1851; Reissue No. 375, dated July 8, 1856.

*To all whom it may concern:*

Be it known that I, J. M. BOTTUM, of the city, county, and State of New York, have invented a new and useful mode of securing pinions and staffs of watches and similar articles into the mandrels of lathes, &c., for the purpose of turning, facing, drilling, grinding, or polishing, the following being a description thereof, in which my invention is fully ascertained and set forth, reference being had to the accompanying drawings, in which the device is fully illustrated, the several figures being on a magnified scale the more clearly to delineate my invention.

Figure 1 is an end view of a chuck, with a tube fitted thereon; Fig. 2, a longitudinal section through the axis of the same, A being the chuck; B, the tube. Fig. 3 is an end view of a chuck; and Fig. 4 a longitudinal section without the tube. (Shown in Figs. 1 and 2.) Figs. 5 and 6 are views of a wheel and pinion as affixed to a chuck where the tube is used. Figs. 7 and 8 are side views of a chuck without the tube B, with either end of a balance-shaft secured thereto. Figs. 9, 10, 11, and 12 are the prominent parts of a watch, that readily wrought in the lathe with my improvements, consisting of a duplex staff in part, a lever-staff, an anchor-staff, and cylinder, introduced for illustration of the application of the machine to practical purposes.

The nature of my invention in employing certain means of readily affixing small articles of various forms and sizes to a mandrel for turning and other purposes, and is particularly applicable to watch-work, such as the staffs and pinions, by which they are more readily centered and wrought than by any other chuck heretofore used for analogous purposes, whereby the usual mechanical devices resorted to for holding the piece in the chuck and sliding puppet are dispensed with.

The construction and application of my improvement may be described as follows: A is a chuck of any desirable length, having a screw on its rear end for securing it to the mandrel of a lathe in the usual way. In the front end of this mandrel there is a recess, *a*, forming a center point at the axis of revolution, as clearly seen at Figs. 2, 4, and 6. This chuck A may be furnished with a surrounding tube, B, or said tube may be dispensed with. The figures of the drawings show both ways of construction. The tube B, when used, projects over the end of the chuck and forms a cavity for the reception of cement over the end of the chuck, as seen at Figs. 2 and 6.

*b c d*, Figs. 5 and 6, are a wheel-pinion and staff in watch-work. (Shown affixed to the chuck in Fig. 6.)

C is the cement by which the connection is made between the chuck and article to be turned, by which it is held while being worked. This adhesive cement C projects beyond the end of the chuck A or tube B when that is used, as seen in the figures. It should be composed of material that becomes plastic when warm and is rigid when cold. Any composition that will properly hold the article to the chuck may be used. When the cement is warm and plastic, adhering to the end of the chuck, the staff or other article is inserted therein and pressed into the recessed center *a* of the chuck, one end being thus perfectly centered. The staff is brought into line with ease and certainty, and the several lathe operations performed in the manufacture of the small pieces used in watch-work and other similar articles, either in their manufacture or repair.

By the adoption of my improved mode of securing the work to the chuck, through the employment of cement and the female center *a*, as described, a firm and large bearing-hold is procured, and a true center speedily obtained, whereby fitting all the varied articles are readily effected, and the ordinary expensive and complex arrangements for fixing the articles to be wrought in the lathe, &c., are dispensed with; also, the necessity of a second or sliding center is obviated, as the pivot or piece to be worked, however small, may be thus firmly held to the chuck, and the time ordinarily consumed in centering by mechanical arrangements saved, by which their expense and intricacy of management, as well as their cost, are obviated, and less risk is incurred of breaking where the pivot or pinion is very small, by the use of a second center; and the article held by my method may be readily operated on by a graver or other appropriate tool held in one hand instead of the usual drill-bow, thus leaving the other hand at liberty to use a magnifying-glass, instead of the spectacles now usually employed in minute work.

Having thus fully described my invention and its uses, what I claim therein, and desire to secure by Letters Patent, is—

The employment of adhesive cement for securing staffs and pinions of watches and like articles of small dimensions for lathe operation, in combination with a chuck, A, having a female center, *a*, therein, either with or without the tube B, or its equivalent, as described and set forth, or any device substantially the same.

JAMES M. BOTTUM.

Witnesses:
JOHN SUTTON,
SAML. COLMAN.